United States Patent
Gurumoorthy et al.

(10) Patent No.: US 11,785,540 B2
(45) Date of Patent: Oct. 10, 2023

(54) UE POWER SAVING IN NR USING UE ASSISTANCE INFORMATION

(71) Applicant: APPLE INC., Cupertino, CA (US)

(72) Inventors: Sethuraman Gurumoorthy, Cupertino, CA (US); Birgit Breining, Bavaria-Bayern (DE); Dawei Zhang, Cupertino, CA (US); Fangli Xu, Beijing (CN); Haijing Hu, Cupertino, CA (US); Longda Xing, Cupertino, CA (US); Rama Diwakara Rao Noolu, Cupertino, CA (US); Srirang A. Lovlekar, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 176 days.

(21) Appl. No.: 17/593,122

(22) PCT Filed: Apr. 8, 2020

(86) PCT No.: PCT/CN2020/083750
§ 371 (c)(1),
(2) Date: Sep. 9, 2021

(87) PCT Pub. No.: WO2021/203292
PCT Pub. Date: Oct. 14, 2021

(65) Prior Publication Data
US 2022/0312312 A1 Sep. 29, 2022

(51) Int. Cl.
*H04W 76/10* (2018.01)
*H04W 52/02* (2009.01)
*H04W 76/27* (2018.01)
*H04W 24/08* (2009.01)

(52) U.S. Cl.
CPC ....... *H04W 52/0209* (2013.01); *H04W 24/08* (2013.01); *H04W 76/27* (2018.02)

(58) Field of Classification Search
CPC ............ H04W 52/0209; H04W 24/08; H04W 76/27; H04W 8/24; H04W 28/0247; H04W 28/0284; H04W 76/10; H04B 7/18539; Y02D 30/70
See application file for complete search history.

(56) References Cited

U.S. PATENT DOCUMENTS

| 10,070,361 B2* | 9/2018 | Fukuta | H04W 36/22 |
| 2016/0113057 A1* | 4/2016 | Haneji | H04W 4/70 370/328 |
| 2019/0053037 A1* | 2/2019 | Shu | H04W 48/18 |

(Continued)

FOREIGN PATENT DOCUMENTS

CN 104137612 A 11/2014

OTHER PUBLICATIONS

PCT/CN2020/083750, International Search Report and Written Opinion, dated Dec. 28, 2020, 9 pages.

(Continued)

*Primary Examiner* — Andrew Wendell
(74) *Attorney, Agent, or Firm* — Dorsey & Whitney LLP

(57) ABSTRACT

Apparatuses, systems, and methods are provided for managing UE upgrade requests using UE assistance information (UAI), including network controlled upgrade support, UE initiated upgrade requests, and/or budget based upgrade requests.

20 Claims, 7 Drawing Sheets

(56) References Cited

U.S. PATENT DOCUMENTS

| | | | |
|---|---|---|---|
| 2019/0215729 A1 | 7/2019 | Oyman et al. | |
| 2020/0221290 A1* | 7/2020 | Wiemann | H04W 8/24 |
| 2020/0267753 A1* | 8/2020 | Adjakple | H04W 72/54 |
| 2020/0359192 A1* | 11/2020 | Lim | H04W 76/27 |
| 2022/0022282 A1* | 1/2022 | Lee | H04W 76/27 |

OTHER PUBLICATIONS

MediaTek Inc. (Rapporteur), "Email discussion summary on running 38.331 CR for Power Saving", R2-2001912 (Revision of R2-2000844), 3GPP TSG-RAN WG2 Meeting #109e, Online, Agenda Item 6.11.1, Feb. 24-Mar. 6, 2020, 21 pages.

CATT, "Reporting UE Assistance Info to NR SN", R2-2000255, 3GPP TSG-RAN WG2 Meeting #109 electronic, Elbonia, Agenda Item 6.11.3, Feb. 24-Mar. 6, 2020, 37 pages.

Qualcomm Inc., "[AT109e][505][Pow] Email discussion on open issues on UE assistance", R2-2001914, 3GPP TSG-RAN WG2 Meeting #109 electronic, Elbonia, Agenda Item 6.11.3, Feb. 24-Mar. 6, 2020, 24 pages.

\* cited by examiner

UE POWER SAVING IN NR USING UE ASSISTANCE INFORMATION

TECHNICAL FIELD

This application relates generally to wireless communication systems, and more specifically to user equipment (UE) power saving in new radio (NR).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node or g Node B (gNB). A gNB may also be referred to as a next generation Node B.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mm-Wave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
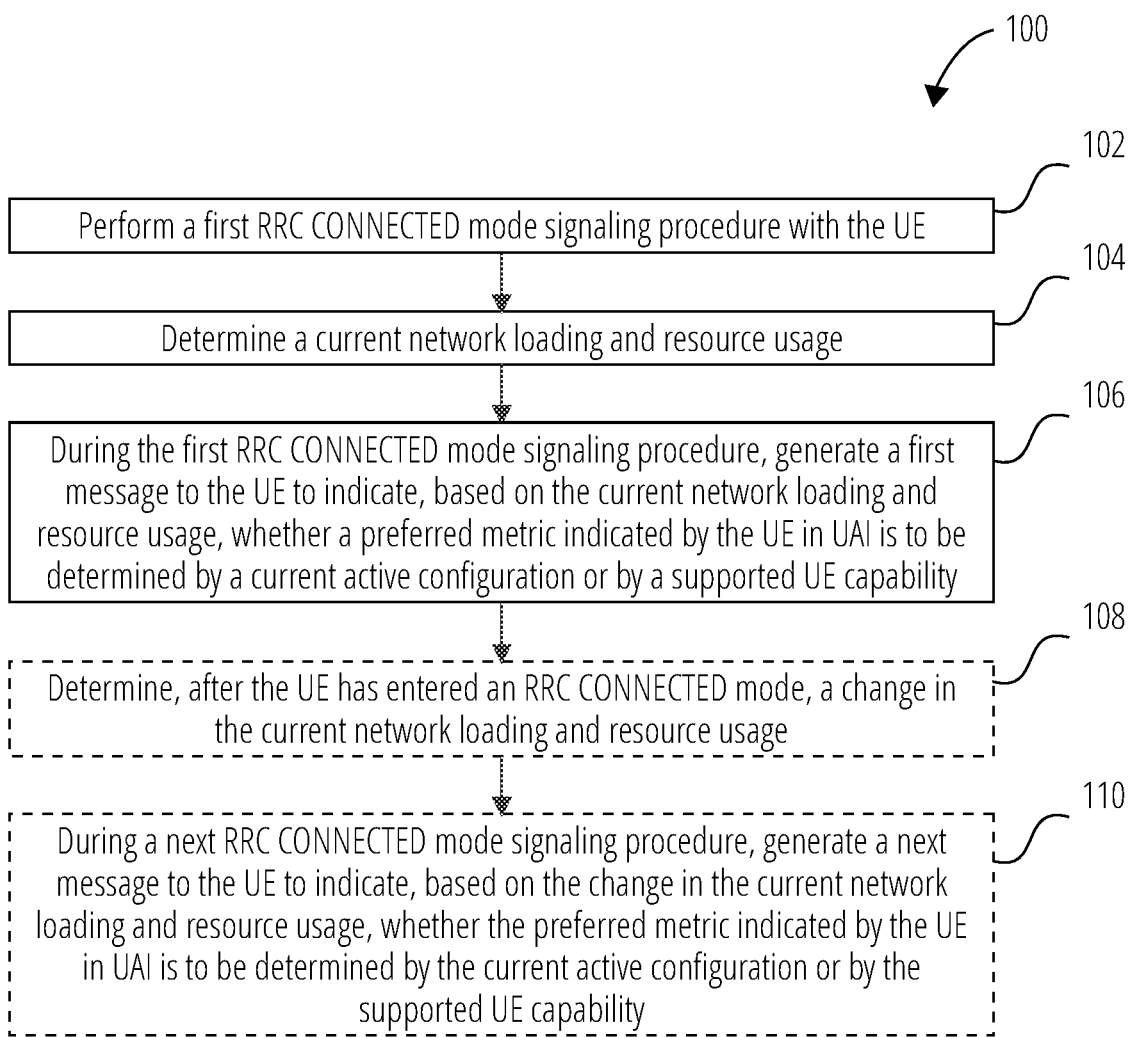
FIG. 1 illustrates a method for a wireless communication network to manage UE upgrade requests in accordance with one embodiment.

A UE may send UE assistance information (referred to as UAI or UEAssistanceInformation) to a wireless network in an uplink (UL) message when the UE is in RRC CONNECTED mode. The UE assistance information may include metrics to assist the UE to conserve power. For example, the UE assistance information may indicate that he if the UE's battery is low or the UE is overheated. The network may then respond to the UE assistance information by, for example, extending a discontinuous reception (DRX) duration or adjust another power saving configuration for the UE. In certain implementations, it may be up to the network to decide which action to take in response to various metrics reported in the UE assistance information, or to take no action at all.

Whenever a UE is in RRC CONNECTED mode, the UE may already be operating under a current active configuration for a particular metric. Certain implementations of wireless networks are currently unable or unsure how to handle a range of values of a preferred parameter for a given metric requested in the UE assistance information. For example, the network may not be able to determine whether the metric should be limited to the current active configuration or limited to the UE capability (for that metric) regardless of the current active configuration.

In certain situations, a network or network operator or vendor may prefer to not allow an upgrade request (i.e.) request for a preferred value of a metric which is more than the current active configuration but up to the UE capability for that metric, while a user or UE vendor may prefer that the upgrade request be allowed. The network may prefer not to allow the upgrade request as it would not allow the UE to request for a higher preferred value for a given metric if the current active configuration for that metric is a smaller value than the UE capability for that metric. The network may be concerned that allowing such requests may waste resources due to UEs requesting upgrades arbitrarily.

For example, a UAI requested metric "reducedMaxMIMO-LayersFR1" may allow a UE to indicate how many reduced multiple input multiple output (MIMO) layers it can support on downlink (DL) or UL in FR1. An example information element (IE) for reducedMaxMIMO-LayersFR1 may include:

```
reducedMaxMIMO-LayersFR1   SEQUENCE {
      reducedMIMO-LayersFR1-DL        MIMO-LayersDL,
      reducedMIMO-LayersFR1-UL        MIMO-LayersUL
   } OPTIONAL,
   MIMO-LayersDL ::=        ENUMERATED {twoLayers, fourLayers,
eightLayers}
   MIMO-LayersUL ::=        ENUMERATED {oneLayer, twoLayers, fourLayers}
```

In the UAI requested metric reducedMaxMIMO-LayersFR1, if the current active configuration for DL is four layers, but the UE capability is up to eight layers, then the network (or network operator) may prefer that the UE be limited to use either two layers or four layers only.

The UE (or user or UE vendor), however, may prefer to allow the UE to request for a higher preferred value for a given metric (up to the UE capability), even if the current active configuration for that metric is a smaller value than the UE capability for that metric. Thus, in the above example for UAI requested metric reducedMaxMIMO-LayersFR1, the UE may still prefer to request for eight layers (e.g., when attempting data intensive high throughput streaming or downloading). There are additional advantages for the UE to request for a higher preferred value for a given metric including, for example, the UE can request for a preferred metric value commensurate with its current state (e.g., if battery level is higher, the UE may request for enhanced capability and vice versa).

Thus, it would be useful to provide solutions that address both the network's concerns and the UE's requirements.

Network Controlled Upgrade Support

In one embodiment, as part of an RRC CONNECTED mode signaling procedure (e.g., during radio resource control (RRC) connection setup and/or RRC connection resume), based on a current network side loading and resource usage, the network may indicate to the UE whether a UE request for a preferred metric in UAI will be determined by a current active configuration (i.e., upgrade request not allowed) or by a supported UE capability (i.e., upgrade request allowed). In certain such embodiments, if the network loading/resource constraint has changed after a UE has entered RRC CONNECTED mode, the network can choose existing RRC CONNECTED mode signaling procedures (e.g., RRC Reconfiguration) to accordingly manage the upgrade support. Thus, the network can effectively enable and disable the UE's use of upgrade requests through UAI.

FIG. 1 is a flowchart illustrating a method 100 for a wireless communication network to manage UE upgrade requests according to certain embodiments. In block 102, the method 100 includes performing a first RRC CONNECTED mode signaling procedure with the UE. The first RRC CONNECTED mode signaling procedure may be, for example, an RRC connection setup procedure or an RRC connection resume procedure. In block 104, the method 100 includes determining a current network loading and resource usage. In block 106, during the first RRC CONNECTED mode signaling procedure, the method 100 includes generating a first message to the UE to indicate, based on the current network loading and resource usage, whether a preferred metric indicated by the UE in UAI is to be determined by a current active configuration or by a supported UE capability.

In certain embodiments, after the UE has entered an RRC CONNECTED mode, in block 108, the method 100 further includes a change in the current network loading and resource usage. In block 110, during a next RRC CONNECTED mode signaling procedure, the method 100 includes generating a next message to the UE to indicate, based on the change in the current network loading and resource usage, whether the preferred metric indicated by the UE in UAI is to be determined by the current active configuration or by the supported UE capability. In certain embodiments, the network may periodically, or based on its local implementation triggers, continue evaluating (in block 108) whether there is a change in the current network loading and resource usage and repeating the actions of block 110 during an entire RRC CONNECTED mode duration.

UE Initiated Upgrade Request Based on Certain Conditions

In addition, or in other embodiments, the UE may autonomously initiate an upgrade request. Such embodiments may be for certain predetermined situations, predetermined conditions, and/or predetermined metrics that are agreed to by the network and the UE. Skilled persons will recognize from the disclosure herein that the following example upgrade scenarios are provided by way of example only, and that the disclosed embodiments may be used for many other upgrade scenarios.

For example, if a UE is capable of E-UTRAN New Radio-Dual Connectivity (EN-DC) mode and a current UE use case needs an additional NR secondary cell group (SCG) leg, but the network has not configured one yet, the UE may autonomously generate a message comprising UAI indicating a preference for the additional NR SCG leg. The network may then respond by configuring the additional NR SCG leg for the UE.

As another example, when a UE is connected to a power charger and a current UE use case may benefit from a higher number of DL MIMO layers over and above what is the current active configuration, the UE may autonomously generate a message comprising UAI indicating a preference for a higher number of DL MIMO layers. The network may then respond by configuring the higher number of DL MIMO layers.

As yet another example, the UE may prefer a longer connected DRX duration than what is the current active configuration. If previously configured or agreed to by the network, the UE may autonomously generate a message comprising UAI indicating the preference for the longer connected DRX duration.

In certain embodiments, although the UE may autonomously request an upgrade under certain predetermined conditions, the network may determine whether or not to grant the request based on the current network load, resource usage, or other factors. Further, certain embodiments may combine network controlled upgrade support and UE initiated upgrade requests. For example, when the network has indicated (e.g., during an RRC CONNECTED mode procedure) that upgrade requests are disabled (e.g., during a disabled period), the UE may only send upgrade requests for certain predetermined cases agreed to by the network.

Figure 2:
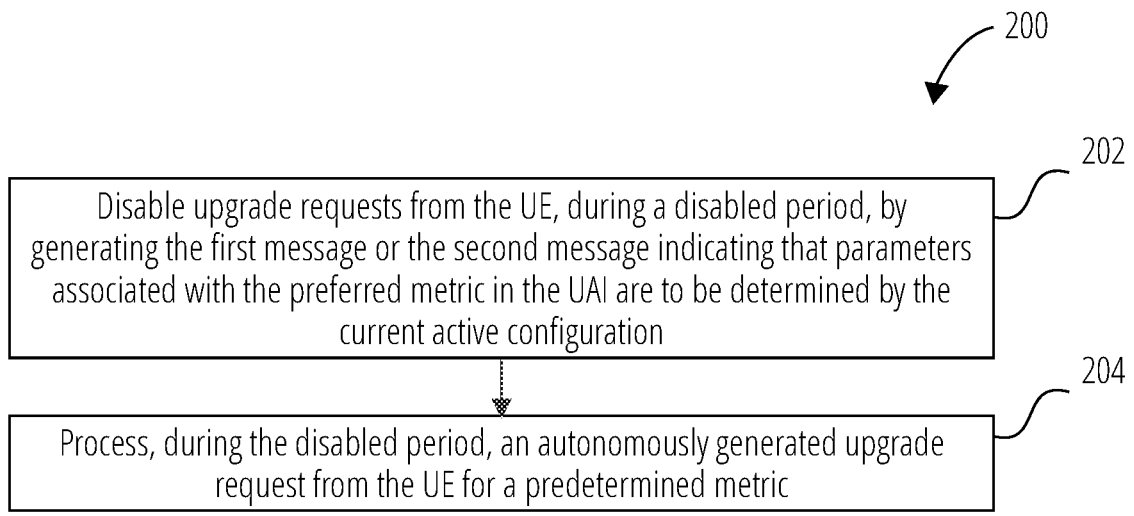
FIG. 2 illustrates a method for a wireless network in accordance with one embodiment.

FIG. 2 is a flowchart illustrating a method 200 for a wireless network according to one embodiment. With reference to the first message and the second message discussed in FIG. 1, in block 202 of FIG. 2 the method 200 includes disabling upgrade requests from the UE, during a disabled period, by generating the first message or the second message indicating that parameters associated with the preferred metric in the UAI are to be determined by the current active configuration. In block 204, the method 200 includes processing, during the disabled period, an autonomously generated upgrade request from the UE for a predetermined metric. The autonomously generated upgrade request may be received from the UE after the expiration of a prohibit timer (discussed below) which started upon receiving a previous upgrade request from the UE for the predetermined metric.

Budget Based Upgrade Request

In addition, or in other embodiments, a budgeted approach may be used to limit the number of times a UE can request for a preferred metric that is better than a current active configuration. For example, in RRC CONNECTED mode, every reattempt of UAI for a particular metric (controlled by a prohibit timer for that metric) may be done only when the number of such attempts is less than a budgeted maximum value. The budgeted maximum value may be specified by a predetermined value (and is expected not to be 0). Thus, if the budgeted maximum value is 1, then within that RRC CONNECTED mode, the UE can request for an upgrade only once. After this upgrade request, the prohibit timer is started. Once the prohibit timer expires, the UE cannot ask for any further upgrade request until the end of the RRC Connection. The UE may only request for change of preferred value of metric up to the current active configuration.

In certain embodiments, a UE accumulated reattempt counter is used to track the number of attempts by the UE to request an upgrade of a particular metric. For example, if the budgeted maximum value is 3, then the UE accumulated reattempt counter may be set to 3 and decremented by 1 each time the UE sends UAI to indicate an upgrade preference for a particular metric. In other embodiments the UE accumulated reattempt counter may increment with each attempt until a threshold corresponding to the budgeted maximum value is met. The UE accumulated reattempt counter may be reset when the UE exits RRC CONNECTED mode or in other cases when the UAI indicated parameters are reset.

To prevent UEs from requesting an upgrade too often, certain embodiments define an upgrade request timer based bar window that may be an integral multiple of the prohibit timer for that metric which spaces out and avoids back to back upgrade requests from a UE. In certain embodiments, the upgrade request bar window is an integral multiple of the existing prohibit timer value (e.g., T_bar_window=N*T_prohibit_timer, N>=1) for that metric to keep the design simple and ensure that both the original prohibit timer and the new bar window timer will expire at the same time. In other embodiments, however, the bar window timer is not an integral multiple of the prohibit timer. A UE UAI signaling to the network for requesting an upgrade (e.g., a UE initiated upgrade request) takes into account the restrictions imposed by the budgeted count and the upgrade request timer based bar window.

Budget based upgrade request embodiments may be combined with network controlled upgrade embodiments and/or UE initiated upgrade request embodiments.

Figure 3:
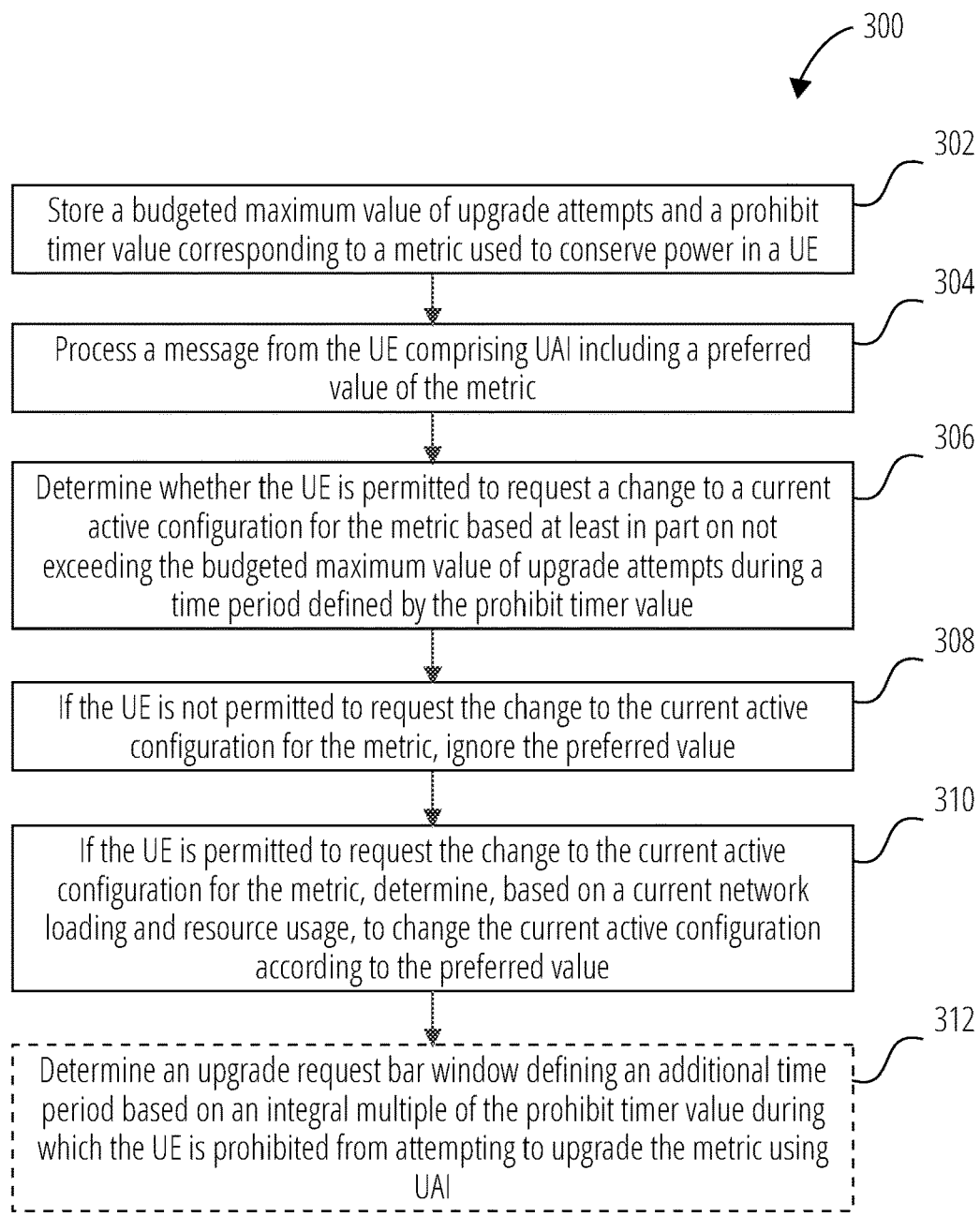
FIG. 3 illustrates a method for a gNB in accordance with one embodiment.

FIG. 3 is a flowchart illustrating a method 300 for a gNB according to certain embodiments. In block 302, the method 300 includes storing a budgeted maximum value of upgrade attempts and a prohibit timer value corresponding to a metric used to conserve power in a UE. In block 304, the method 300 includes processing a message from the UE comprising UAI including a preferred value of the metric. In block 306, the method 300 includes determining whether the UE is permitted to request a change to a current active configuration for the metric based at least in part on not exceeding the budgeted maximum value of upgrade attempts during a time period defined by the prohibit timer value. For example, a timer based on the prohibit timer value may be started after a first attempt to change the current active configuration for the metric using UAI. A number of upgrade attempts of the metric during the time period may be tracked using a UE accumulated reattempt counter. In block 308, if the UE is not permitted to request the change to the current active configuration for the metric, the method 300 includes ignoring the preferred value. In block 310, if the UE is permitted to request the change to the current active configuration for the metric, the method 300 includes determining, based on a current network loading and resource usage, to change the current active configuration according to the preferred value.

In certain embodiments, as shown in block 312, the method 300 includes determining an upgrade request bar window defining an additional time period based on an integral multiple of the prohibit timer value during which the UE is prohibited from attempting to upgrade the metric using UAI.

In certain embodiments, the method 300 may include aspects of other embodiments disclosed herein. For example, the wireless network may determine the current network loading and resource usage, and during an RRC CONNECTED mode signaling procedure, generate a signal to the UE to indicate (based on the current network loading and resource usage) whether the preferred metric indicated by the UE in the UAI is to be determined by the current active configuration or by a supported UE capability. Determining whether the UE is permitted to request the change to the current active configuration for the metric further may include determining that the metric corresponds to a predetermined metric or predetermined condition that allows the UE to autonomously decide, without further input from the eNB and/or gNB, to request an upgrade for the metric using UAI.

Figure 4:
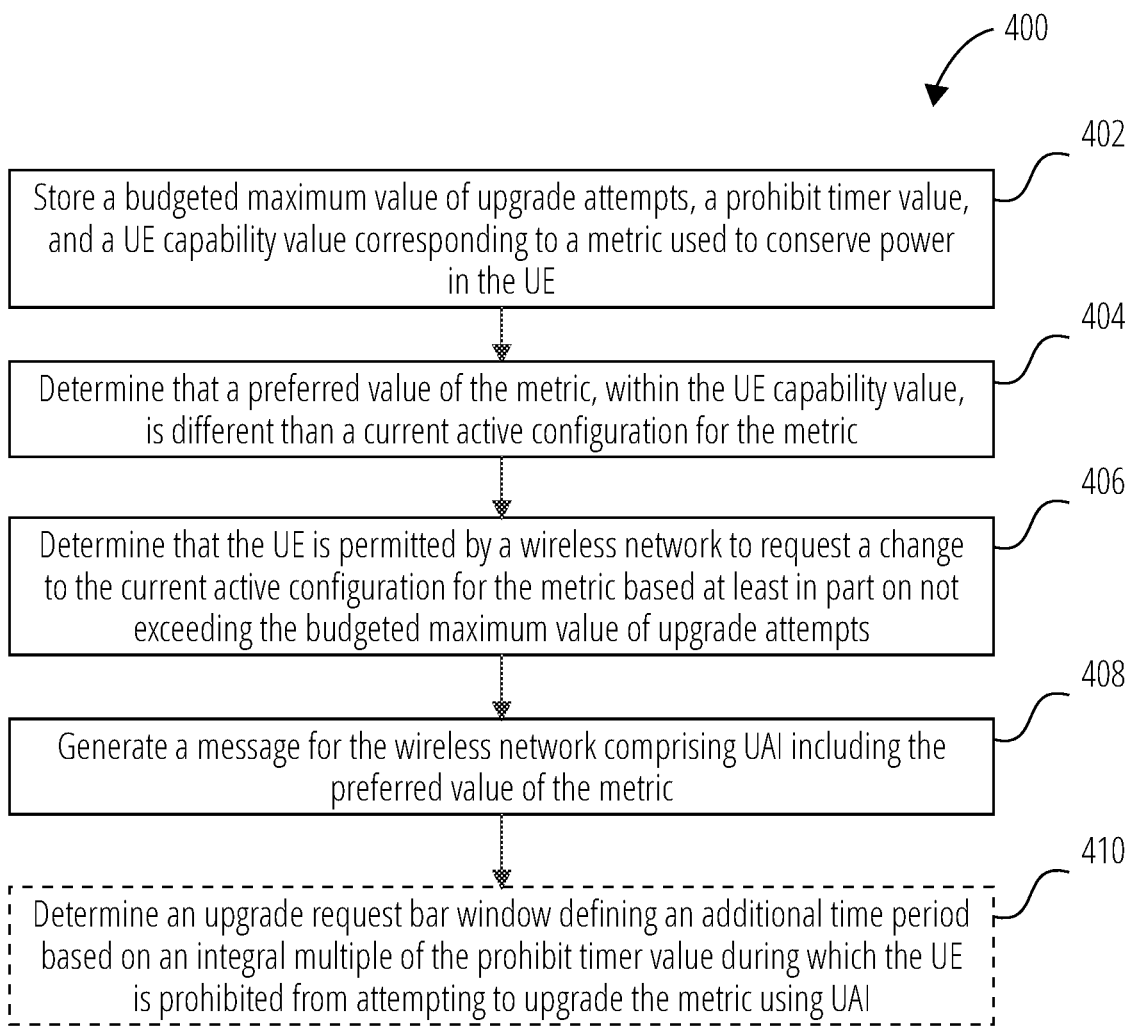
FIG. 4 illustrates a method for a UE in accordance with one embodiment.

FIG. 4 is a flowchart illustrating a method 400 for a UE according to certain embodiments. In block 402, the method 400 includes storing a budgeted maximum value of upgrade attempts, a prohibit timer value, and a UE capability value corresponding to a metric used to conserve power in the UE. In block 404, the method 400 includes determining that a preferred value of the metric, within the UE capability value, is different than a current active configuration for the metric. In block 406, the method 400 includes determining that the UE is permitted by a wireless network to request a change to the current active configuration for the metric based at least in part on not exceeding the budgeted maximum value of upgrade attempts. If the request to change the current active configuration comprises an upgrade request, the request is counted against the budgeted count and a timer based on the prohibit timer value may be started after a first attempt to change the current active configuration for the metric using UAI. However, if the request to change the current active configuration is for any preferred metric value less than the current active configuration, the request is not counted against the budgeted count and the timer is not started. A number of upgrade attempts of the metric during the time period using a UE accumulated reattempt counter. The UE accumulated reattempt counter may be reset when the UE exits an RRC CONNECTED mode or when one or more parameters corresponding to the metric are reset. In block 408, the method 400 includes generating a message for the wireless network comprising UAI including the preferred value of the metric.

In certain embodiments, as shown in block 410, method 400 includes determining an upgrade request bar window defining an additional time period based on an integral multiple of the prohibit timer value during which the UE is prohibited from attempting to upgrade the metric using UAI.

In certain embodiments, the method 400 may include aspects of other embodiments disclosed herein. For example, the UE may determine that it is permitted by the wireless network to request the change to the current active configuration for the metric by, during an RRC CONNECTED mode signaling procedure with the wireless network, processing a signal from the wireless network indicating that, based on current network loading and resource usage, upgrade requests using UAI are enabled. Determining that the UE is permitted by the wireless network to request the change to the current active configuration for the metric may further include determining that the metric corresponds to a predetermined metric or predetermined condition that allows the UE to autonomously decide, without further input from the wireless network, to request an upgrade for the metric using UAI.

Budget based upgrade request embodiments may be combined with network controlled upgrade embodiments and/or UE initiated upgrade request embodiments.

Embodiments herein may allow a UE to request for a preferred metric up to a maximum UE capability so as to not be limited to a current active configuration, e.g., for truly genuine UE side use cases.

Budget based upgrade request embodiments may alleviate a network's or a network operator's concern of potential resource wastage. For example, support for upgrade requests may be controlled by the network based on its current resource availability and loading and any random request from a UE (if any) is counted against the total available budget. An additional prohibit timer for upgrade requests prevents any spurious back to back request.

Example Systems and Components

The following description includes systems and components that may be used to implement embodiments herein, including the example methods shown in FIG. 1 to FIG. 4.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 5:
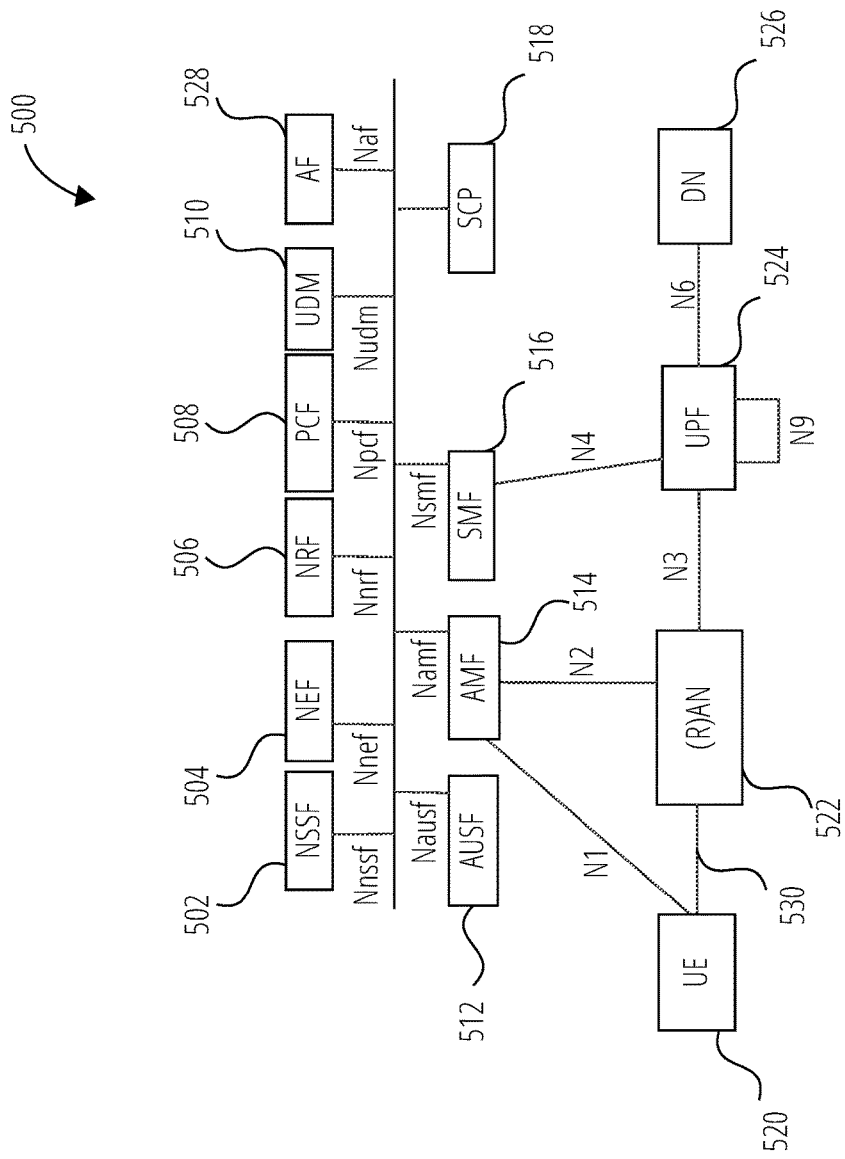
FIG. 5 illustrates an example service based architecture in accordance with certain embodiments.

FIG. 5 illustrates a service based architecture 500 in 5GS according to one embodiment. As described in 3GPP TS 23.501, the service based architecture 500 comprises NFs such as an NSSF 502, a NEF 504, an NRF 506, a PCF 508, a UDM 510, an AUSF 512, an AMF 514, an SMF 516, for communication with a UE 520, a (R)AN 522, a UPF 524, and a DN 526. The NFs and NF services can communicate directly, referred to as Direct Communication, or indirectly via a SCP 518, referred to as Indirect Communication. FIG. 5 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 5 are described below.

The NSSF 502 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 504 supports exposure of capabilities and events. NF capabilities and events may be securely exposed by the NEF 504 (e.g., for 3rd party, Application Functions, and/or Edge Computing). The NEF 504 may store/retrieve information as structured data using a standardized interface (Nudr) to a UDR. The NEF 504 may also secure provision of information from an external application to 3GPP network and may provide for the Application Functions to securely provide information to the 3GPP network (e.g., expected UE behavior, 5GLAN group information, and service specific information), wherein the NEF 504 may authenticate and authorize and assist in throttling the Application Functions. The NEF 504 may provide translation of internal-external information by translating between information exchanged with the AF and information exchanged with the internal network function. For example, the NEF 504 translates between an AF-Service-Identifier and internal 5G Core information such as DNN and S-NSSAI. The NEF 504 may handle masking of network and user sensitive information to external AF's according to the network policy. The NEF 504 may receive information from other network functions (based on exposed capabilities of other network functions), and stores the received information as structured data using a standardized interface to a UDR. The stored information can be accessed and re-exposed by the NEF 504 to other network functions and Application Functions, and used for other purposes such as analytics. For external exposure of services related to specific UE(s), the NEF 504 may reside in the HPLMN. Depending on operator agreements, the NEF 504 in the HPLMN may have interface(s) with NF(s) in the VPLMN. When a UE is capable of switching between EPC and 5GC, an SCEF+NEF may be used for service exposure.

The NRF 506 supports service discovery function by receiving an NF Discovery Request from an NF instance or SCP and providing the information of the discovered NF instances to the NF instance or SCP. The NRF 506 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 508 supports a unified policy framework to govern network behavior. The PCF 508 provides policy rules to Control Plane function(s) to enforce them. The PCF 508 accesses subscription information relevant for policy decisions in a Unified Data Repository (UDR). The PCF 508 may access the UDR located in the same PLMN as the PCF.

The UDM 510 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 510 uses subscription data (including authentication data) that may be stored in a UDR, in which case a UDM implements the application logic and may not require an internal user data storage and several different UDMs may serve the same user in different transactions. The UDM 510 may be located in the HPLMN of the subscribers it serves, and may access the information of the UDR located in the same PLMN.

The AF 528 interacts with the Core Network to provide services that, for example, support the following: application influence on traffic routing; accessing the NEF 504; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 504 to interact with relevant Network Functions.

The AUSF 512 supports authentication for 3GPP access and untrusted non-3GPP access. The AUSF 512 may also provide support for Network Slice-Specific Authentication and Authorization.

The AMF 514 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 514. Regardless of the number of Network functions, in certain embodiments there is only one NAS interface instance per access network between the UE and the CN, terminated at one of the Network functions that implements at least NAS security and Mobility Management. The AMF 514 may also include policy related functionalities.

In addition to the functionalities described above, the AMF 514 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 516 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 516 may include policy related functionalities.

The SCP 518 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 518 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 520 may include a device with radio communication capabilities. For example, the UE 520 may comprise a smartphone (e.g., handheld touchscreen mobile computing devices connectable to one or more cellular networks). The UE 520 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 520 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 520 may be configured to connect or communicatively couple with the (R)AN 522 through a radio interface 530, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5GNR (NSA and SA) protocol, and the like. For example, the UE 520 and the (R)AN 522 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 522 to the UE 520 and a UL transmission may be from the UE 520 to the (R)AN 522. The UE 520 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 522 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 522 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 522) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 520 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 524 may act as an anchor point for intra-RAT and inter-RAT mobility, an external PDU session point of interconnect to the DN 526, and a branching point to support multi-homed PDU session. The UPF 524 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 524 may include an uplink classifier to support routing traffic flows to a data network. The DN 526 may represent various network operator services, Internet access, or third party services. The DN 526 may include, for example, an application server.

Figure 6:
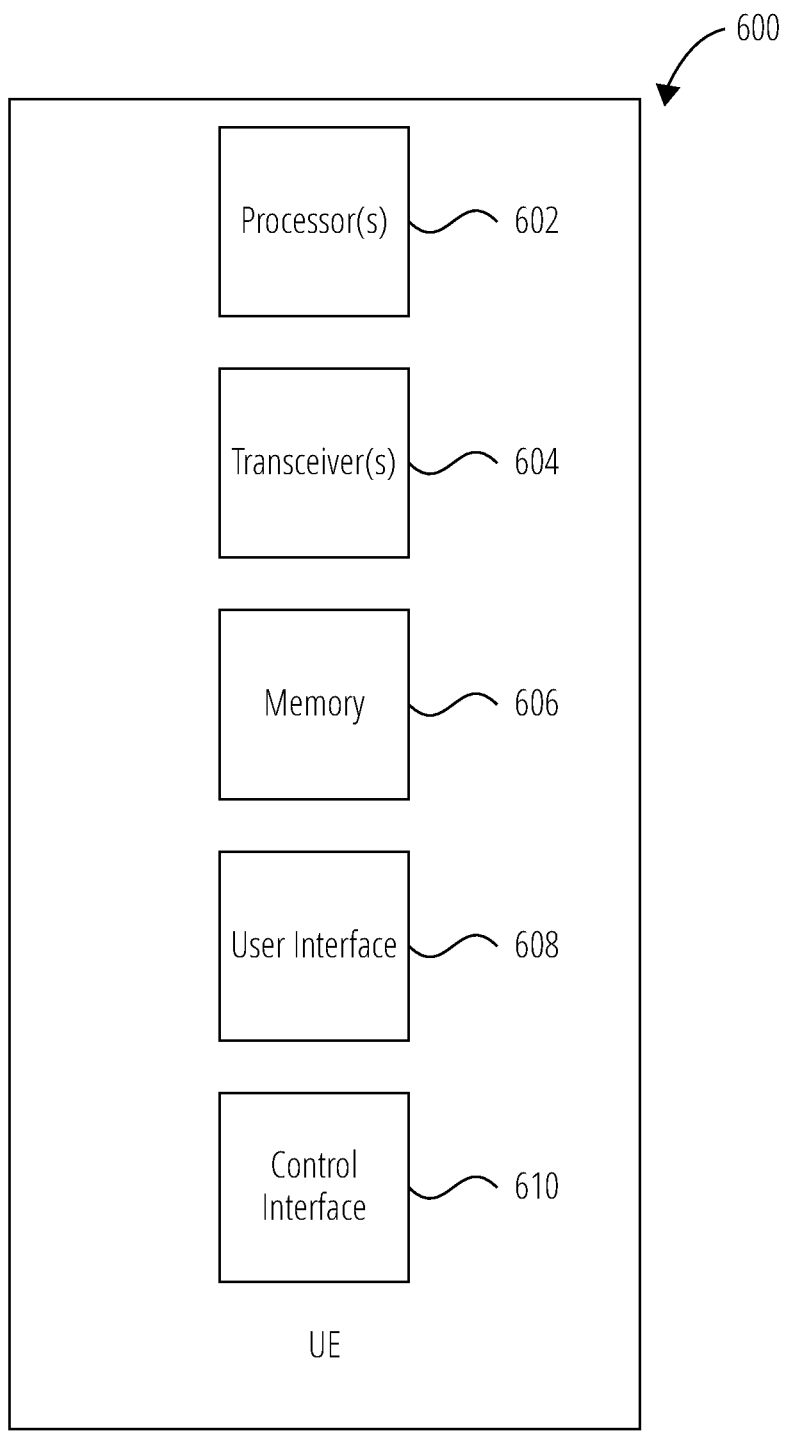
FIG. 6 illustrates a UE in accordance with one embodiment.

FIG. 6 is a block diagram of an example UE 600 configurable according to various embodiments of the present disclosure, including by execution of instructions on a computer-readable medium that correspond to any of the example methods and/or procedures described herein. The UE 600 comprises one or more processor 602, transceiver 604, memory 606, user interface 608, and control interface 610.

The one or more processor 602 may include, for example, an application processor, an audio digital signal processor, a central processing unit, and/or one or more baseband processors. Each of the one or more processor 602 may include internal memory and/or may include interface(s) to communication with external memory (including the memory 606). The internal or external memory can store software code, programs, and/or instructions for execution by the one or more processor 602 to configure and/or facilitate the UE 600 to perform various operations, including operations described herein. For example, execution of the instructions can configure the UE 600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 604, user interface 608, and/or control interface 610. As another example, the one or more processor 602 may execute program code stored in the memory 606 or other memory that corresponds to MAC, RLC, PDCP, and RRC layer protocols standardized by 3GPP (e.g., for NR and/or LTE). As a further example, the processor 602 may execute program code stored in the memory 606 or other memory that, together with the one or more transceiver 604, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 606 may comprise memory area for the one or more processor 602 to store variables used in protocols, configuration, control, and other functions of the UE 600, including data and data structures for operations corresponding to, or comprising, any of the example methods and/or procedures described herein. For example, the memory 606 may store network loading and resource usage information, metrics, a preferred metric, a predetermined metric associated with autonomous UE requests, current active configuration information, UAL an upgrade request, a prohibit timer, a prohibit timer value, a UE accumulated reattempt counter, an upgrade request bar window, and other parameters. Moreover, the memory 606 may comprise non-volatile memory (e.g., flash memory), volatile memory (e.g., static or dynamic RAM), or a combination thereof. Furthermore, the memory 606 may interface with a memory slot by which removable memory cards in one or more formats (e.g., SD Card, Memory Stick, Compact Flash, etc.) can be inserted and removed.

The one or more transceiver 604 may include radio-frequency transmitter and/or receiver circuitry that facilitates the UE 600 to communicate with other equipment supporting like wireless communication standards and/or protocols. For example, the one or more transceiver 604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 602. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 604 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 602 to implement a PHY layer based on OFDM, OFDMA, and/or SC-FDMA technologies, such as described herein with respect to other figures.

The user interface 608 may take various forms depending on particular embodiments, or can be absent from the UE 600. In some embodiments, the user interface 608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 600 may comprise a tablet computing device including a larger touchscreen display. In such embodiments, one or more of the mechanical features of the user interface 608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 600 having a touch screen display are capable of receiving user inputs, such as inputs related to exemplary methods and/or procedures described herein or otherwise known to persons of ordinary skill in the art.

In some exemplary embodiments of the present disclosure, the UE 600 may include an orientation sensor, which can be used in various ways by features and functions of the UE 600. For example, the UE 600 can use outputs of the orientation sensor to determine when a user has changed the physical orientation of the UE 600's touch screen display. An indication signal from the orientation sensor can be available to any application program executing on the UE 600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 610 may take various forms depending on particular embodiments. For example, the control interface 610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 610 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 600 may include more functionality than is shown in FIG. 6 including, for example, a video and/or still-image camera, microphone, media player and/or recorder, etc. Moreover, the one or more transceiver 604 may include circuitry for communication using additional radio-frequency communication standards including Bluetooth, GPS, and/or others. Moreover, the one or more processor 602 may execute software code stored in the memory 606 to control such additional functionality. For example, directional velocity and/or position estimates output from a GPS receiver can be available to any application program executing on the UE 600, including various exemplary methods and/or computer-readable media according to various exemplary embodiments of the present disclosure.

Figure 7:
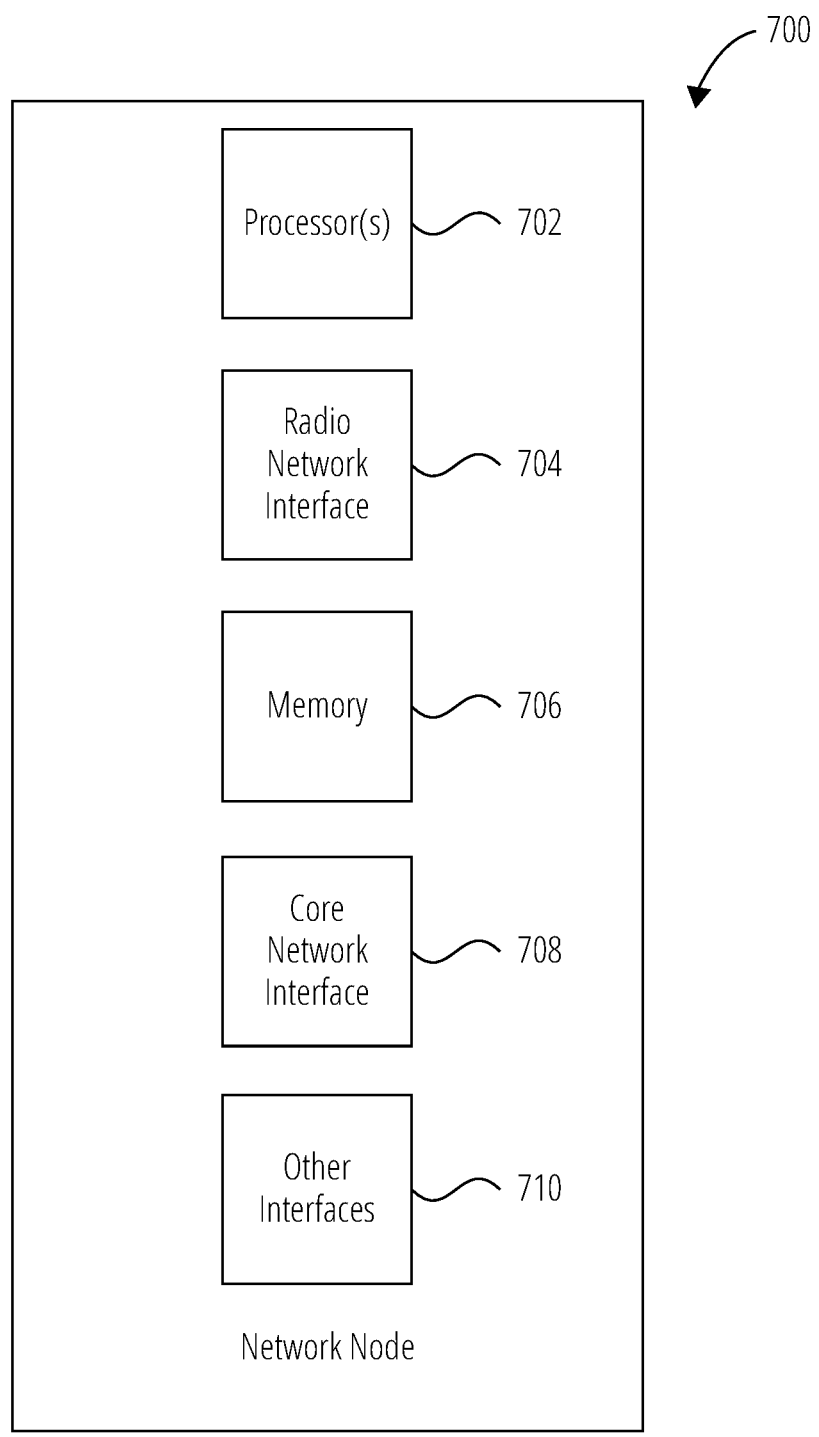
FIG. 7 illustrates a network node in accordance with one embodiment.

FIG. 7 is a block diagram of an example network node 700 configurable according to various embodiments of the present disclosure, including by execution of instructions on a computer-readable medium that correspond to any of the example methods and/or procedures described herein.

The network node 700 includes a one or more processor 702, a radio network interface 704, a memory 706, a core network interface 708, and other interfaces 710. The network node 700 may comprise, for example, a base station, eNB, gNB, access node, or component thereof.

The one or more processor 702 may include any type of processor or processing circuitry and may be configured to perform an of the methods or procedures disclosed herein. The memory 706 may store software code, programs, and/or instructions executed by the one or more processor 702 to configure the network node 700 to perform various operations, including operations described herein. For example, execution of such stored instructions can configure the network node 700 to communicate with one or more other devices using protocols according to various embodiments of the present disclosure, including one or more methods and/or procedures discussed above. Furthermore, execution of such stored instructions can also configure and/or facilitate the network node 700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 704 and the core network interface 708. By way of example and without limitation, the core network interface 708 comprise an S1 interface and the radio network interface 704 may comprise a Uu interface, as standardized by 3GPP. The memory 706 may also store variables used in protocols, configuration, control, and other functions of the network node 700. For example, the memory 606 may store network loading and resource usage information, metrics, a preferred metric, a predetermined metric associated with autonomous UE requests, current active configuration information, UAI, an upgrade request, a prohibit timer, a prohibit timer value, a UE accumulated reattempt counter, an upgrade request bar window, and other parameters. As such, the memory 706 may comprise non-volatile memory (e.g., flash memory, hard disk, etc.), volatile memory (e.g., static or dynamic RAM), network-based (e.g., "cloud") storage, or a combination thereof.

The radio network interface 704 may include transmitters, receivers, signal processors, ASICs, antennas, beamforming units, and other circuitry that enables network node 700 to communicate with other equipment such as, in some embodiments, a plurality of compatible user equipment (UE). In some embodiments, the network node 700 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 704 may include a PHY layer based on OFDM, OFDMA, and/or SC-FDMA technologies. In some embodiments, the functionality of such a PHY layer can be provided cooperatively by the radio network interface 704 and the one or more processor 702.

The core network interface 708 may include transmitters, receivers, and other circuitry that enables the network node 700 to communicate with other equipment in a core network such as, in some embodiments, circuit-switched (CS) and/or packet-switched Core (PS) networks. In some embodiments, the core network interface 708 may include the S1 interface standardized by 3GPP. In some embodiments, the core network interface 708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 710 may include transmitters, receivers, and other circuitry that enables the network node 700 to communicate with external networks, computers, databases, and the like for purposes of operations, administration, and maintenance of the network node 700 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 includes a computer-readable storage medium including instructions that when executed by a processor of a wireless communication network configured to manage user equipment (UE) upgrade requests, cause the processor to: perform a first radio resource control (RRC) CONNECTED mode signaling procedure with the UE; determine a current network loading and resource usage of the wireless communication network; and during the first RRC CONNECTED mode signaling procedure, generate a first message to the UE to indicate, based on the current network loading and resource usage, whether a preferred metric indicated by the UE in UE assistance information (UAI) is to be determined by a current active configuration or by a supported UE capability.

Example 2 includes the computer-readable storage medium of Example 1, wherein the first RRC CONNECTED mode signal procedure is selected from a group comprising an RRC connection setup procedure and an RRC connection resume procedure.

Example 3 includes the computer-readable storage medium of Example 1, wherein the instructions further configure the processor to: determine, after the UE has entered an RRC CONNECTED mode, a change in the current network loading and resource usage; and during a next RRC CONNECTED mode signaling procedure, generate a next message to the UE to indicate, based on the change in the current network loading and resource usage, whether the preferred metric indicated by the UE in UAI is to be determined by the current active configuration or by the supported UE capability.

Example 4 includes the computer-readable storage medium of Example 3, wherein the next RRC CONNECTED mode signal procedure comprises an RRC reconfiguration procedure.

Example 5 includes the computer-readable storage medium of any of Example 1 to Example 4, wherein the instructions further configure the processor to: disable upgrade requests from the UE, during a disabled period, by generating the first message or the second message indicating that the UAI is to be determined by the current active configuration; and process, during the disabled period, an autonomously generated upgrade request from the UE for a predetermined metric.

Example 6 includes the computer-readable storage medium of Example 5, wherein the autonomously generated upgrade request is received from the UE after the expiration of a prohibit timer which started upon receiving a previous upgrade request from the UE for the predetermined metric.

Example 7 includes the computer-readable storage medium of any of Example 1 to Example 4, wherein the instructions further configure the processor to process a reattempt by the UE to indicate the preferred metric in the UAI only when a number of attempts by the UE is less than a budgeted maximum value.

Example 8 includes the computer-readable storage medium of Example 7, wherein the instructions further configure the processor to: track the number of attempts by the UE with a UE accumulated reattempt counter associated with a preferred metric upgrade request during an RRC CONNECTED mode duration; stop the UE accumulated reattempt counter once the budgeted maximum value is reached; and reset the UE accumulated reattempt counter when the UE exits the RRC CONNECTED mode.

Example 9 includes the computer-readable storage medium of Example 8, wherein the instructions further configure the processor to: after every increment of the UE accumulated reattempt counter, start an upgrade request bar window timer; and bar the UE from requesting an upgrade during the upgrade request bar window timer.

Example 10 is an apparatus for a user equipment (UE), the apparatus comprising: memory to store a budgeted maximum value of upgrade attempts, a prohibit timer value, and a UE capability value corresponding to a metric used to conserve power in the UE; and a processor configured to: determine that a preferred value of the metric, within the UE capability value, is different than a current active configuration for the metric; determine that the UE is permitted by a wireless network to request a change to the current active configuration for the metric based at least in part on not exceeding the budgeted maximum value of upgrade attempts during a time period defined by the prohibit timer value; and generate a message for the wireless network comprising UE assistance information (UAI) including the preferred value of the metric.

Example 11 includes the apparatus of Example 10, wherein the processor is further configured to start a timer based on the prohibit timer value after a first attempt to change the current active configuration for the metric using UAI.

Example 12 includes the apparatus of Example 10, wherein the processor is further configured to track a number of upgrade attempts of the metric during the time period using a UE accumulated reattempt counter.

Example 13 includes the apparatus of Example 12, wherein the processor is further configured to reset the UE accumulated reattempt counter when the UE exits a radio resource control (RRC) CONNECTED mode or when one or more parameters corresponding to the metric are reset.

Example 14 includes the apparatus of Example 10, wherein the processor is further configured to determine an upgrade request bar window defining an additional time period based on an integral multiple of the prohibit timer value during which the UE is prohibited from attempting to upgrade the metric using UAI.

Example 15 includes the apparatus of Example 10, wherein to determine that the UE is permitted by the wireless network to request the change to the current active configuration for the metric further comprises, during a radio resource control (RRC) CONNECTED mode signal procedure with the wireless network, the processor is further configured to process a signal from the wireless network indicating that, based on current network loading and resource usage, upgrade requests using UAI are enabled.

Example 16 includes the apparatus of Example 15, wherein the RRC CONNECTED mode signal procedure is selected from a group comprising an RRC connection setup procedure, an RRC connection resume procedure, and an RRC reconfiguration procedure.

Example 17 includes the apparatus of Example 10, wherein to determine that the UE is permitted by the wireless network to request the change to the current active configuration for the metric, the processor is further configured to determine that the metric corresponds to a predetermined metric or predetermined condition that allows the UE to autonomously decide, without further input from the wireless network, to request an upgrade for the metric using UAI.

Example 18 is a method for a next generation Node B (gNB), the method comprising: storing a budgeted maximum value of upgrade attempts and a prohibit timer value corresponding to a metric used to conserve power in a user equipment (UE); processing a message from the UE comprising UE assistance information (UAI) including a preferred value of the metric; determining whether the UE is permitted to request a change to a current active configuration for the metric based at least in part on not exceeding the budgeted maximum value of upgrade attempts during a time period defined by the prohibit timer value; if the UE is not permitted to request the change to the current active configuration for the metric, ignoring the preferred value; and if the UE is permitted to request the change to the current active configuration for the metric, determining, based on a current network loading and resource usage, to change the current active configuration according to the preferred value.

Example 19 includes the method of Example 18, further comprising starting a timer based on the prohibit timer value after a first attempt to change the current active configuration for the metric using UAI.

Example 20 includes the method of Example 18, further comprising tracking a number of upgrade attempts of the metric during the time period using a UE accumulated reattempt counter.

Example 21 includes the method of Example 18, further comprising determining an upgrade request bar window defining an additional time period based on an integral multiple of the prohibit timer value during which the UE is prohibited from attempting to upgrade the metric using UAI.

Example 22 includes the method of any of Example 18 to Example 21, further comprising: determining the current network loading and resource usage; and during a radio resource control (RRC) CONNECTED mode signaling procedure, generating a signal to the UE to indicate, based on the current network loading and resource usage, whether the preferred metric indicated by the UE in the UAI is to be determined by the current active configuration or by a supported UE capability.

Example 23 includes the method of Example 22, wherein the RRC CONNECTED mode signaling procedure is selected from a group comprising an RRC connection setup procedure, an RRC connection resume procedure, and an RRC reconfiguration procedure.

Example 24 includes the method of any of Example 18 to Example 23, wherein determining whether the UE is permitted to request the change to the current active configuration for the metric further comprises determining that the metric corresponds to a predetermined metric or predetermined condition that allows the UE to autonomously decide, without further input from the eNB, to request an upgrade for the metric using UAI.

Example 25 may include an apparatus comprising means to perform one or more elements of a method described in or related to any of the above Examples, or any other method or process described herein.

Example 26 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 27 may include an apparatus comprising logic, modules, or circuitry to perform one or more elements of a method described in or related to any of the above Examples, or any other method or process described herein.

Example 28 may include a method, technique, or process as described in or related to any of the above Examples, or portions or parts thereof.

Example 29 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 30 may include a signal as described in or related to any of the above Examples, or portions or parts thereof.

Example 31 may include a datagram, packet, frame, segment, protocol data unit (PDU), or message as described in or related to any of the above Examples, or portions or parts thereof, or otherwise described in the present disclosure.

Example 32 may include a signal encoded with data as described in or related to any of the above Examples, or portions or parts thereof, or otherwise described in the present disclosure.

Example 33 may include a signal encoded with a datagram, packet, frame, segment, PDU, or message as described in or related to any of the above Examples, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 35 may include a computer program comprising instructions, wherein execution of the program by a processing element is to cause the processing element to carry out the method, techniques, or process as described in or related to any of the above Examples, or portions thereof.

Example 36 may include a signal in a wireless network as shown and described herein.

Example 37 may include a method of communicating in a wireless network as shown and described herein.

Example 38 may include a system for providing wireless communication as shown and described herein.

Example 39 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

What is claimed is:

1. A non-transitory computer-readable storage medium, the non-transitory computer-readable storage medium including instructions that when executed by a processor of a wireless communication network configured to manage user equipment (UE) upgrade requests, cause the processor to:
   perform a first radio resource control (RRC) CONNECTED mode signaling procedure with the UE;
   determine a current network loading and resource usage of the wireless communication network; and
   during the first RRC CONNECTED mode signaling procedure, generate a first message to the UE to indicate, based on the current network loading and resource usage, whether a preferred metric indicated by the UE in UE assistance information (UAI) is to be determined by a current active configuration or by a supported UE capability.

2. The non-transitory computer-readable storage medium of claim 1, wherein the first RRC CONNECTED mode signal procedure is selected from a group comprising an RRC connection setup procedure and an RRC connection resume procedure.

3. The non-transitory computer-readable storage medium of claim 1, wherein the instructions further configure the processor to:
   determine, after the UE has entered an RRC CONNECTED mode, a change in the current network loading and resource usage; and
   during a next RRC CONNECTED mode signaling procedure, generate a next message to the UE to indicate, based on the change in the current network loading and resource usage, whether the preferred metric indicated by the UE in the UAI is to be determined by the current active configuration or by the supported UE capability.

4. The non-transitory computer-readable storage medium of claim 3, wherein the next RRC CONNECTED mode signal procedure comprises an RRC reconfiguration procedure.

5. The non-transitory computer-readable storage medium of claim 1, wherein the instructions further configure the processor to:
   disable upgrade requests from the UE, during a disabled period, by generating the first message or a second message indicating that the UAI is to be determined by the current active configuration; and
   process, during the disabled period, an autonomously generated upgrade request from the UE for a predetermined metric.

6. The non-transitory computer-readable storage medium of claim 5, wherein the autonomously generated upgrade request is received from the UE after an expiration of a prohibit timer which started upon receiving a previous upgrade request from the UE for the predetermined metric.

7. The non-transitory computer-readable storage medium of claim 1, wherein the instructions further configure the processor to process a reattempt by the UE to indicate the preferred metric in the UAI only when a number of attempts by the UE is less than a budgeted maximum value.

8. The non-transitory computer-readable storage medium of claim 7, wherein the instructions further configure the processor to:
   track the number of attempts by the UE with a UE accumulated reattempt counter associated with a preferred metric upgrade request during an RRC CONNECTED mode duration;
   stop the UE accumulated reattempt counter once the budgeted maximum value is reached; and
   reset the UE accumulated reattempt counter when the UE exits the RRC CONNECTED mode.

9. The non-transitory computer-readable storage medium of claim 8, wherein the instructions further configure the processor to:
   after every increment of the UE accumulated reattempt counter, start an upgrade request bar window timer; and
   bar the UE from requesting an upgrade during the upgrade request bar window timer.

10. An apparatus for a user equipment (UE), the apparatus comprising:
- memory to store a budgeted maximum value of upgrade attempts, a prohibit timer value, and a UE capability value corresponding to a metric used to conserve power in the UE; and
- a processor configured to:
  - determine that a preferred value of the metric, within the UE capability value, is different than a current active configuration for the metric;
  - determine that the UE is permitted by a wireless network to request a change to the current active configuration for the metric based at least in part on not exceeding the budgeted maximum value of upgrade attempts during a time period defined by the prohibit timer value; and
  - generate a message for the wireless network comprising UE assistance information (UAI) including the preferred value of the metric.

11. The apparatus of claim 10, wherein the processor is further configured to start a timer based on the prohibit timer value after a first attempt to change the current active configuration for the metric using the UAI.

12. The apparatus of claim 10, wherein the processor is further configured to track a number of upgrade attempts of the metric during the time period using a UE accumulated reattempt counter.

13. The apparatus of claim 12, wherein the processor is further configured to reset the UE accumulated reattempt counter when the UE exits a radio resource control (RRC) CONNECTED mode or when one or more parameters corresponding to the metric are reset.

14. The apparatus of claim 10, wherein the processor is further configured to determine an upgrade request bar window defining an additional time period based on an integral multiple of the prohibit timer value during which the UE is prohibited from attempting to upgrade the metric using the UAI.

15. The apparatus of claim 10, wherein to determine that the UE is permitted by the wireless network to request the change to the current active configuration for the metric further comprises, during a radio resource control (RRC) CONNECTED mode signal procedure with the wireless network, the processor is further configured to process a signal from the wireless network indicating that, based on current network loading and resource usage, upgrade requests using the UAI are enabled.

16. The apparatus of claim 15, wherein the RRC CONNECTED mode signal procedure is selected from a group comprising an RRC connection setup procedure, an RRC connection resume procedure, and an RRC reconfiguration procedure.

17. The apparatus of claim 10, wherein to determine that the UE is permitted by the wireless network to request the change to the current active configuration for the metric, the processor is further configured to determine that the metric corresponds to a predetermined metric or predetermined condition that allows the UE to autonomously decide, without further input from the wireless network, to request an upgrade for the metric using the UAI.

18. A method for a next generation Node B (gNB), the method comprising:
- storing a budgeted maximum value of upgrade attempts and a prohibit timer value corresponding to a metric used to conserve power in a user equipment (UE);
- processing a message from the UE comprising UE assistance information (UAI) including a preferred value of the metric;
- determining whether the UE is permitted to request a change to a current active configuration for the metric based at least in part on not exceeding the budgeted maximum value of upgrade attempts during a time period defined by the prohibit timer value;
- if the UE is not permitted to request the change to the current active configuration for the metric, ignoring the preferred value; and
- if the UE is permitted to request the change to the current active configuration for the metric, determining, based on a current network loading and resource usage, to change the current active configuration according to the preferred value.

19. The method of claim 18, further comprising starting a timer based on the prohibit timer value after a first attempt to change the current active configuration for the metric using the UAI.

20. The method of claim 18, further comprising tracking a number of upgrade attempts of the metric during the time period using a UE accumulated reattempt counter.

* * * * *